United States Patent [19]

Nishimiya et al.

[11] 3,935,844
[45] Feb. 3, 1976

[54] IGNITION TIMING CONTROL SYSTEM

[75] Inventors: Torazo Nishimiya, Mito; Yasunori Mori, Hitachi, both of Japan

[73] Assignee: Hitachi, Ltd., Japan

[22] Filed: Sept. 11, 1973

[21] Appl. No.: 396,311

[30] Foreign Application Priority Data
Sept. 13, 1972 Japan............................... 47-91225

[52] U.S. Cl.................. 123/117 R; 123/146.5 A; 123/148 DS
[51] Int. Cl.².......................................... F02P 1/00
[58] Field of Search...... 123/148 E, 148 DS, 148 C, 123/117 A, 117 R, 146.5 A

[56] References Cited
UNITED STATES PATENTS

| | | | |
|---|---|---|---|
| 3,020,897 | 2/1962 | Sekine et al.................. | 123/32 EA |
| 3,156,228 | 11/1964 | Blackwood.................. | 123/146.5 A |
| 3,584,608 | 6/1971 | Shibabaki..................... | 123/148 DS |
| 3,626,909 | 12/1971 | Hayashida.................... | 123/148 DS |
| 3,626,910 | 12/1971 | Porsche.......................... | 123/148 E |
| 3,685,295 | 8/1972 | Tatsutomi et al............. | 123/148 DS |
| 3,704,591 | 12/1972 | Tatsutomi...................... | 123/148 DS |
| 3,716,991 | 2/1973 | Tatsutomi et al............. | 123/148 DS |
| 3,752,128 | 8/1973 | Tatsutomi et al............. | 123/117 A |
| 3,794,008 | 2/1974 | Mathews......................... | 123/148 C |
| 3,809,042 | 5/1974 | Hosho et al................... | 123/148 DS |

OTHER PUBLICATIONS
Millman and Taub "Pulse, Digital and Switching Waveforms," Copyright 1965, McGraw Hill, pp. 422–431.

*Primary Examiner*—Wendell E. Burns
*Assistant Examiner*—Paul Devinsky
*Attorney, Agent, or Firm*—Craig & Antonelli

[57] ABSTRACT

A dilute air-fuel mixture operation as a method for purifying exhaust gas is effective for reducing simultaneously carbon monoxide (CO), hydrocarbons (HC), and nitrogen oxides (NOx) contained in the engine exhaust. However, such operation reduces engine power remarkably. Though a reciprocating internal combustion engine having first and second spark plugs has been introduced to compensate this disadvantage, it has in turn brought about the problem that there is a tendency of increasing quantities of nitrogen oxides. While an increase of the interval between the firing of the two plugs may control an increase of nitrogen oxides, this results in a reduction of engine power. A most effective method of exhaust purification is to control an ignition system such that the interval between the firing of two plugs is made short only when high engine power is required, and the firing interval is made comparatively long in the normal operation of the engine.

8 Claims, 9 Drawing Figures

IGNITION TIMING CONTROL SYSTEM

This invention relates to an ignition timing control system suitable for a reciprocating internal combustion engine.

In an internal combustion engine operating or fuel of gasoline, an operation with lean or dilute air-fuel mixture is well known as a method to reduce carbon monoxide (CO), unburned hydrocarbons (HC) and nitrogen oxides (NOx) in the engine exhaust. However, this system has a fundamental disadvantage of a degradation in the operational performance of the engine owing to a reduction of engine output. Multiple spark plug reciprocating internal combustion engine featuring provision of two spark plugs for each combustion chamber, has an effect in improving the engine output. This preferable effect of this system, however, is canceled by an increase of nitrogen oxides. For a reduction of nitrogen oxides, it is effective to retard the firing timing on a normal operation requiring less engine power.

This delay of firing timing satisfies the requirements of the reduction of nitrogen oxides and of an improvement in the operational performance under normal operational condition. A problem to be solved still remains in the method of this ignition timing retardation. That is, the engine output is reduced by the amount proportional to the delay of firing timing on an acceleration requiring extra engine output. This brings about a degradation of the performance of the engine during acceleration. This circumstance necessitates such a control measure that when normally operating a firing timing of one of the two plugs is delayed several to several tens of degrees from that of the other plug, and when operating on an acceleration the ignition timing is advanced by an amount correspoding to that of the acceleration.

That is, a new ignition timing control system is desired in which an exhaust purification is predominant when operating on the normal condition requiring not much engine power, while the operational performance is prior requirement when operating on an acceleration requiring extra engine power, so that both the exhaust purification and the improvement of the operational performance may be achieved over for the operation as a whole.

Accordingly, the present invention proposes a control system to satisfy the requirements mentioned above.

An object of this invention is to provide an ignition timing control system for a multiple spark plug reciprocating internal combustion engine including two spark plugs in each combustion chamber to optimumly control the time interval between ignitions of two spark plugs considering the properties of the exhaust gas and the engine power.

Another object of this invention is to provide a system to satisfy both the requirements for the exhaust purification and for the operational performance of the engine by avoiding the deterioration of operational performance during acceleration at the temporal sacrifice of the exhaust purification.

A further object of the invention is to provide a system which is not affected by high frequency noise from the high tension ignition system, and also which is physically small and is manufactured at a low cost.

The novel features of the present invention as well as advantages thereof, will be more readily understood from the following description, when read in connection with the accompanying drawings, in which similar reference numerals in different drawings indicate corresponding parts, and in which.

Figure 1:
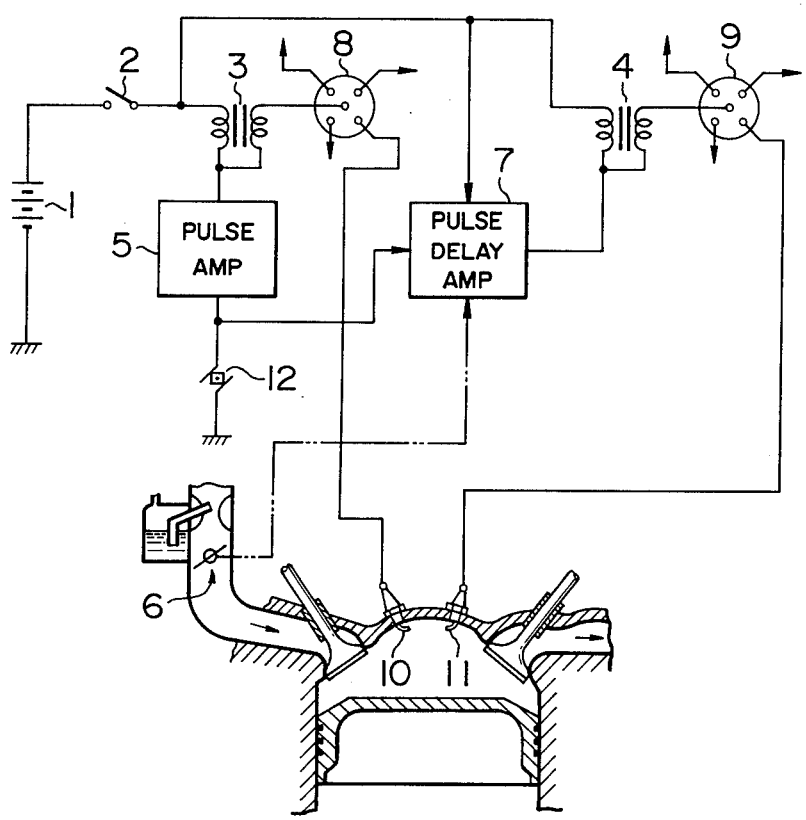
FIG. 1 is a block diagram of a multiple spark plug reciprocating internal combustion engine incorporating the control system of present invention.

Referring now to FIG. 1, there is shown a block diagram of a firing system employing the system of the present invention in which the designation of the reference numerals are as follos: 1 for a battery, 2 for an ignition switch, 3 for a first ignition coil, 4 for a second ignition coil, 5 for a transistorized pulse amplifier, 6 for a throttle valve, 7 for a pulse delay and amplification circuit, 8 for a first distributor, 9 for a second distributor, 10 for a first plug, 11 for a second plug, and 12 for a breaker point.

Figure 2:
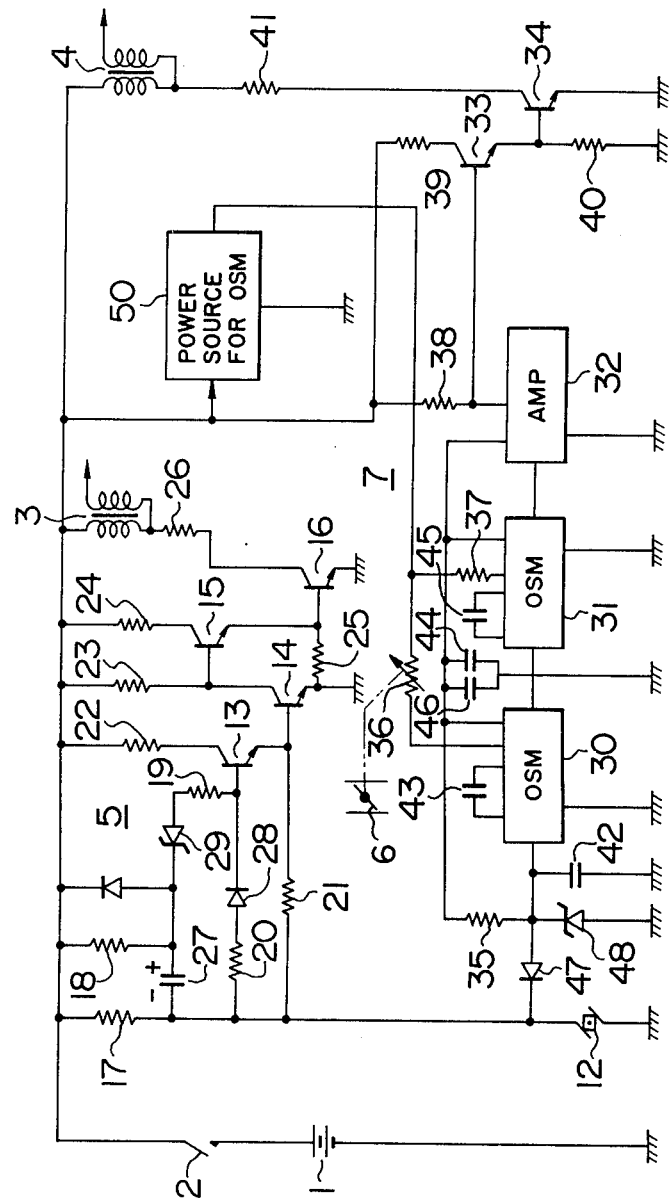
FIG. 2 is a schematic circuit diagram of an embodiment of this invention.

FIG. 2 shows a schematic circuit diagram of an embodiment of this invention which comprises the transistorized pulse amplifier 5 including major components of transistors 13 and 16, resistors 17 to 26, a condenser 27, a diode 28 and a zener diode 29. In this circuit, a current in the primary winding of the first ignition coil 3 is not directly cut off by the breaker point 12, but is cut off by a power transistor 16 which is controlled by an a first pulse originating the base from the break of the breaker 12 or equivalent means. For this reason, a large ignition energy may be obtained by interrupting only a small current. The pulse delay and amplifying circuit 7 comprises monostable multivibrators 30 and 31, power transistors 33 and 34, resistors 35 to 41, condensors 42 to 46, a diode 47 and a zener diode 48. The circuit 7 serves to produce a third pulse delayed by a predetermined time from a trigger pulse, and thereafter to amplify the third pulse. The third pulse is used to cut off the current flowing through the primary winding of the second ignition coil 4. The power source 50 supplies electric power to the monostable multivibrators 30 and 31.

The operation of the circuit constructed as described above will be explained hereinafter. A d.c. voltage from the battery 1, at first, is supplied to a control circuit upon turning on the ignition switch 2. When the breaker point 12 is closed, the condenser 27 is charged with the polarity as shown in FIG. 2 thereby to cut off the transistor 13. This controls successively the operation of the transistors 14, 15 and the power transistor 16, and finally causes the current to flow through the primary winding of the first ignition coil 3. That is, cutting off the transistor 13 causes the transistor 14 to be turned off, and the transistors 15 and 16 to be conductive. Then, when the breaker point 12 is opened, the voltage charged in the condenser 27 is applied to the base electrode of the transistor 13 through the zener diode 29, to thereby trigger the transistors 13 and 14. This causes the bias voltage on the base of the transistor 15 to become zero thereby cutting off the transistor 15 and subsequently the power transistor 16. Cutting off of the transistor 16 causes an interruption of the primary current of the first ignition coil 3, which in turn induces a high voltage in the secondary coil. The thus induced high voltage is impressed on one of the spark plugs 10 in the first group through the first distributor 8, and produces an arc discharge at the gap of the spark-plug.

On the other hand, the trigger signal from the breaker point 12 also is given to the pulse delay and amplification circuit 7, where said pulse is modified into the second pulse having a given pulse width and a time delay determined by a circuit constants of monostable multivibrators 30 and 31.

Figure 3:
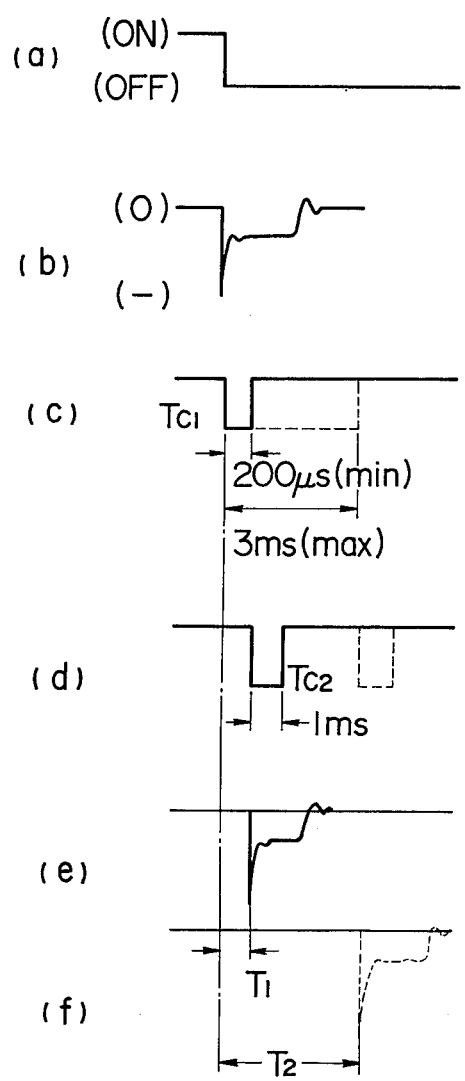
FIGS. 3A–3F are illustrations for explaining the operation of the circuit shown in FIG. 2.

This modification is shown in FIG. 3, wherein waveform ($a$) shows the on-off condition of the breaker point; waveform ($b$) shows the secondary voltage of the first ignition coil; waveform ($c$) indicates the output pulse of the monostable multivibrator 30; waveform ($d$) is an output pulse of the monostable multivibrator 31; and waveforms ($e$) and ($f$) show the secondary voltages of the second ignition coil 4, ($e$) being the waveform in the case when the time delay is chosen to be possible minimum and ($f$) being the waveform in the case when the time delay is set at possible maximum value. The time delay $Tc_1$ or the width of the output pulse of the monostable multivibrator 30 is determined by a time constant which depends on the values of resistor 36 and condenser 43. Experiments have shown that it is practically preferable to adopt a time delay ranging from 200 $\mu$s to 3 ms.

In this embodiment, the opening of the throttle valve of the engine is correlated with the adjustable tap of the variable resistor 36 so that when the engine requires a large output power such as during acceleration, that is, when the throttle valve is widely opened, the resistance value of the resistor 36 is made small, while when in the normal operation, or when the thorttle valve is narrowly opened, the value of the resistor 36 is made large. However, it will be understood that other kinds of measures and structures may be made for the relationship between the engine output power and the width of the output pulse of the multivibrator 30, as well as for the signal transmission method.

The output pulse derived from the monostable multivibrator 31 has a constant pulse width $Tc_2$ determined by a time constant which depends on the capacitance of the condenser 45 and the value of the resistor 37.

That is, the third pulse derived from the monostable multivibrators 30, 31 and amplified through the amplifier 32, control the switching operation of the transistor 34. This switching control causes intermittent interruption of the primary current of the second ignition coil 4 thereby inducing a high voltage in the secondary winding of the second ignition coil 4. The high voltage is impressed on a spark plug selected by the second distributor 9 in the second group of spark plugs, and results in an arc discharge at the spark-plug gap.

Thus, it is possible to suitably control the ignition interval between the first and the second group of the ignition plugs by varying the circuit constant in relation with the output power of the engine.

Figure 4:
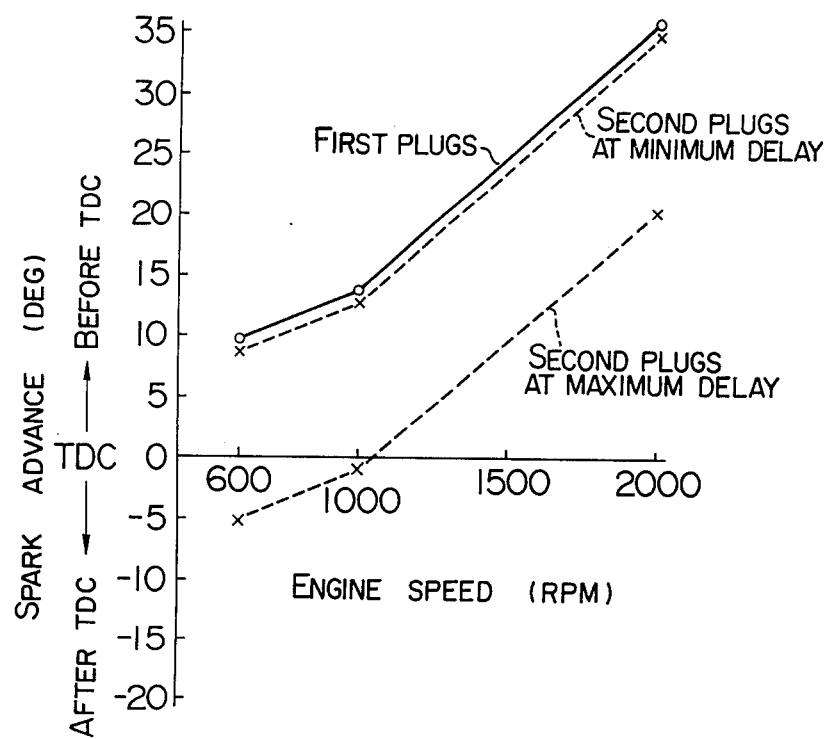
FIG. 4 shows spark advance curves showing experimental results of ignition timing control performed by the system of this invention.

FIG. 4 shows experimental results of the operation of the device according to this invention.

FIG. 4 shows the relation of the spark advance to the engine speed and more particularly the difference of the spark advance between the first and the second groups of the spark plugs, the spark advance at idling (600 r.p.m.) for the first group of plugs being set at 10° before the top dead center (TDC). This experiment shows that the ignition interval between the two plug groups may be changed over a range of 15° in terms of crank-angle. Thus, the delay of ignition timing of the second plug relative to that of the first plug may be controlled without affecting the spark advance performance of an automatic spark advance device.

As described above, the present invention provides an ignition timing control system for the multiple spark plug reciprocating internal combustion engine having two ignition plugs in each combustion chamber wherein the ignition timing of one ignition plug is retarded from that of the other plug in the normal operational condition, while the retarded spark advance is advanced only when an extra engine output is required as in acceleration. The descrease of the spark advance in the normal operation results in the reduction of nitrogen oxides and in facilitating oxidization for hydrocarbon and carbon monoxide by promoting the heat reaction in the reactor while the restored engine output during acceleration improves the operational performance, thereby attaining a gross effect that the requirements for the exhaust purification and for the improvement of the operational performance of the engine are successfully met. Further, an integrated circuit may be employed for the pulse delay circuit in this invention. This reduces possible malfunctions due to high frequency noise from a high tension system. Though a two-point distributor having two breaker points is required in the system of this invention as in the conventional multi-plug combustion system, a conventional two-point distributor may be used without any modification. Accordingly, this invention brings about no substantial increase in the production cost. Further it is the device of the invention is suitable for a mass production.

Many modifications of the disclosure will be apparent to those skilled in the art for practicing the advantages of this invention which is defined by the appended claims.

What we claim is:

1. An ignition timing control system for a reciprocating internal combustion engine having a first spark plug and a second spark plug in each combustion chamber comprising:

a throttle valve for controlling the amount of air-fuel mixture supplied to the engine;

a breaker for generating a trigger signal;

a pulse amplifier generating a first pulse signal for actuating the first spark plug in response to the trigger signal from said breaker; and a pulse delay amplifier having
   a. a first pulse generator for generating a second pulse signal in response to the trigger signal from said breaker, said second pulse signal having a pulse width which is continuously variable substantially in inverse proportion to the amount of opening of the throttle valve, and
   b. a second pulse generator generating a third pulse signal for actuating the second spark plug in response to the trailing end of the second pulse signal, the initiation of the third pulse signal being delayed from the first pulse signal by the time interval corresponding to the width of the second pulse signal, so that the interval of time between operations of said first and second spark plugs is varied with the variation of the amount of opening of the throttle valve.

2. An ignition timing control system as claimed in claim 1, further comprising means for changing a time constant of the first pulse generator for changing the width of the second pulse signal.

3. An ignition timing control system for a reciprocating internal combustion engine having a first spark plug and a second spark plug in each combustion chamber comprising:
   a throttle valve for controlling an amount of air-fuel mixture supplied to the engine;
   a breaker for generating a trigger signal;
   a pulse amplifier generating a first pulse signal for actuating the first spark plug in response to the trigger signal from said breaker;
   a pulse delay amplifier having
      a. a first monostable-multivibrator generating a second pulse signal of variable pulse width in response to the trigger signal from said breaker;
      b. a second monostable-multivibrator generating a third pulse signal for actuating the second spark plug in response to the trailing end of the second pulse signal, the initiation of the third pulse signal being delayed from the first pulse signal by a time interval corresponding to the width of the second pulse signal; and
   means for changing the width of the second pulse signal substantially in inverse proportion to the amount of opening of said throttle valve, so that the interval of time between operations of said first and second spark plugs is continuously varied with the variation of the amount of opening of said throttle valve.

4. An ignition timing control system as claimed in claim 3, in which said pulse width changing means includes a variable resistor, whose resistance changes in substantially inverse proportion to the amount of opening of said throttle valve.

5. In a reciprocating piston internal combustion engine including a first spark plug and a second spark plug in each combustion chamber, and a throttle valve for controlling the amount of the air-fuel mixture supplied to the engine, the improvement comprising:
   first means, responsive to the rotation of the engine crankshaft, for generating a trigger signal;
   second means, coupled between said first means and said first spark plug, for supplying a first pulse signal to said first spark plug in response to the generation of said trigger signal; and
   third means, coupled between said first means and said second spark plug, for supplying a second pulse signal to said second spark plug, said second pulse signal being delayed relative to said first pulse signal by a time interval which is proportional to the degree of opening of said throttle valve, so that said time interval and, accordingly, the delay of operation of said second spark plug relative to said first spark plug, is continuously variable with the variation of the degree of opening of said throttle valve.

6. The improvement according to claim 5, wherein said third means comprises
   a first pulse generator for generating a first delay pulse the width of which is proportional to the degree of opening of said throttle valve, and
   a second pulse generator, coupled to said first pulse generator, for generating said second pulse signal upon the termination of said first delay pulse.

7. The improvement according to claim 6, wherein said first pulse generator comprises a monostable multivibrator having a variable resistor for controlling the time constant thereof, said variable resistor being coupled to said throttle valve so that the resistance of said valuable resistor is established in accordance with the degree of opening of said throttle valve.

8. The improvement according to claim 7, wherein said second pulse generator includes a monostable multivibrator having a fixed time constant.

* * * * *